March 27, 1962

A. G. LUTHI ETAL 3,026,660

CAN FILLING MACHINE

Filed April 1, 1960

INVENTORS:
ALOIS G. LUTHI
EDWARD E. DUTTON

BY

Mellin and Hanscom
ATTORNEYS

March 27, 1962 A. G. LUTHI ETAL 3,026,660
CAN FILLING MACHINE
Filed April 1, 1960 8 Sheets-Sheet 2
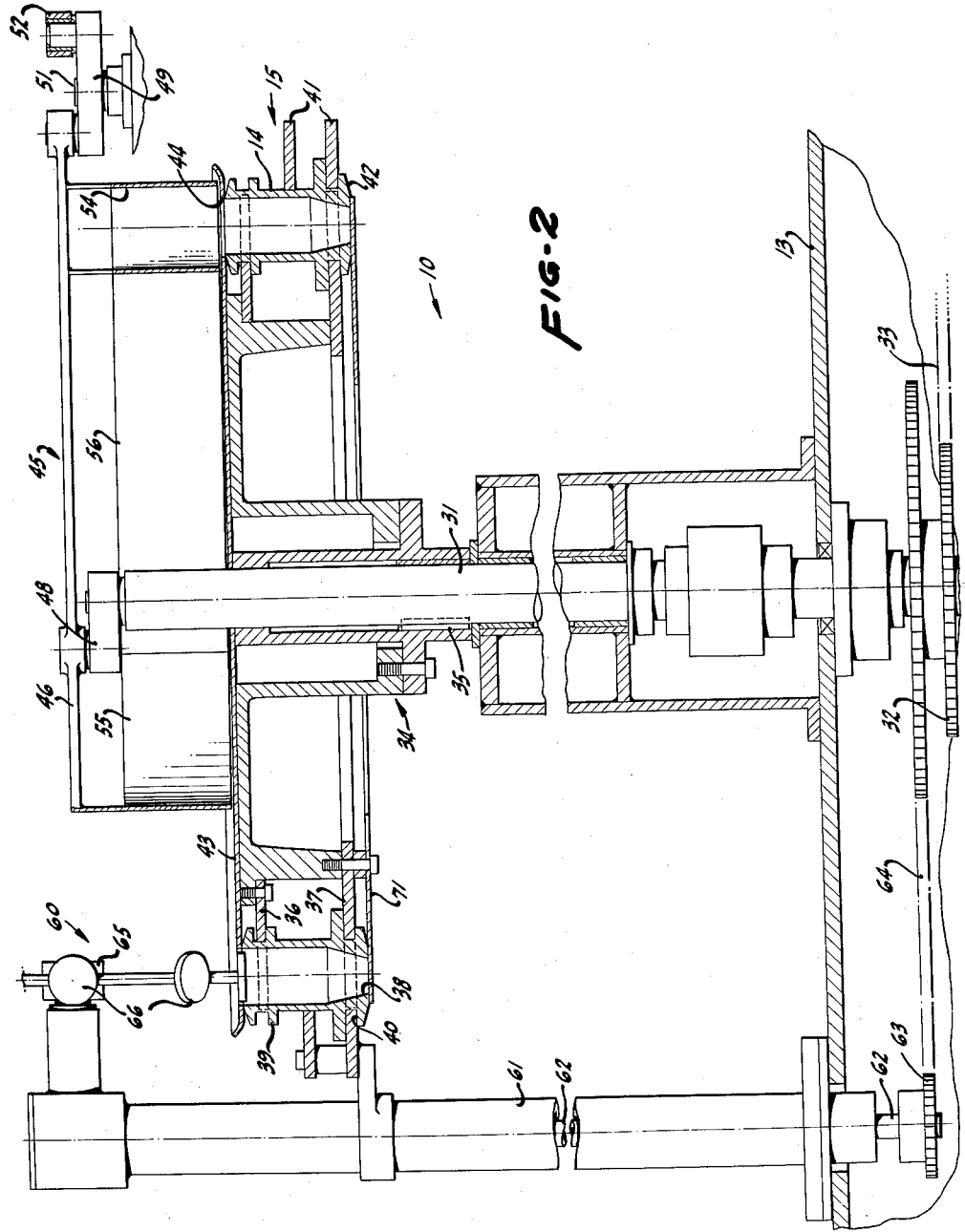
INVENTORS:
ALOIS G. LUTHI
EDWARD E. DUTTON
BY
Mellin and Hanson
ATTORNEYS

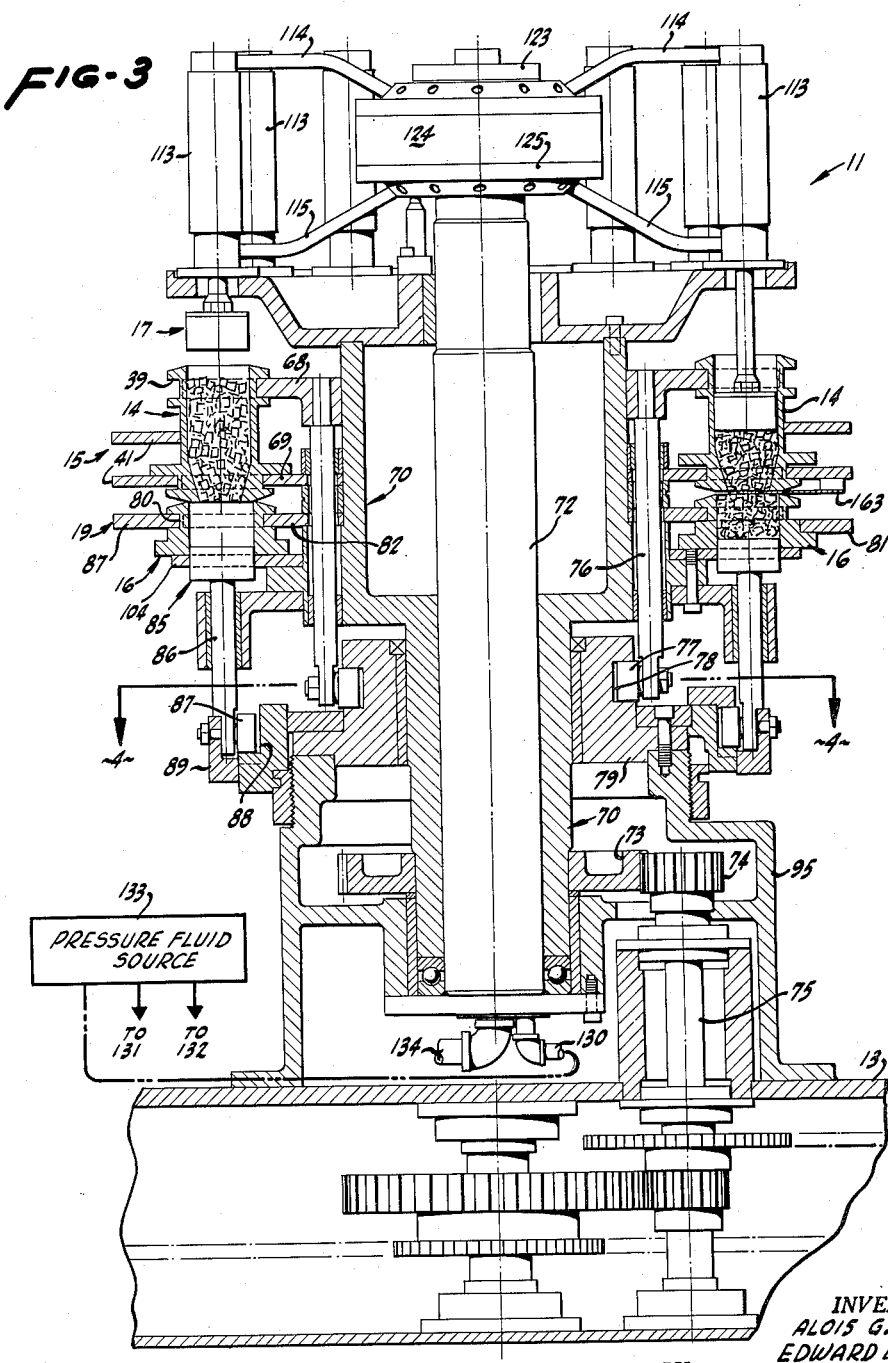

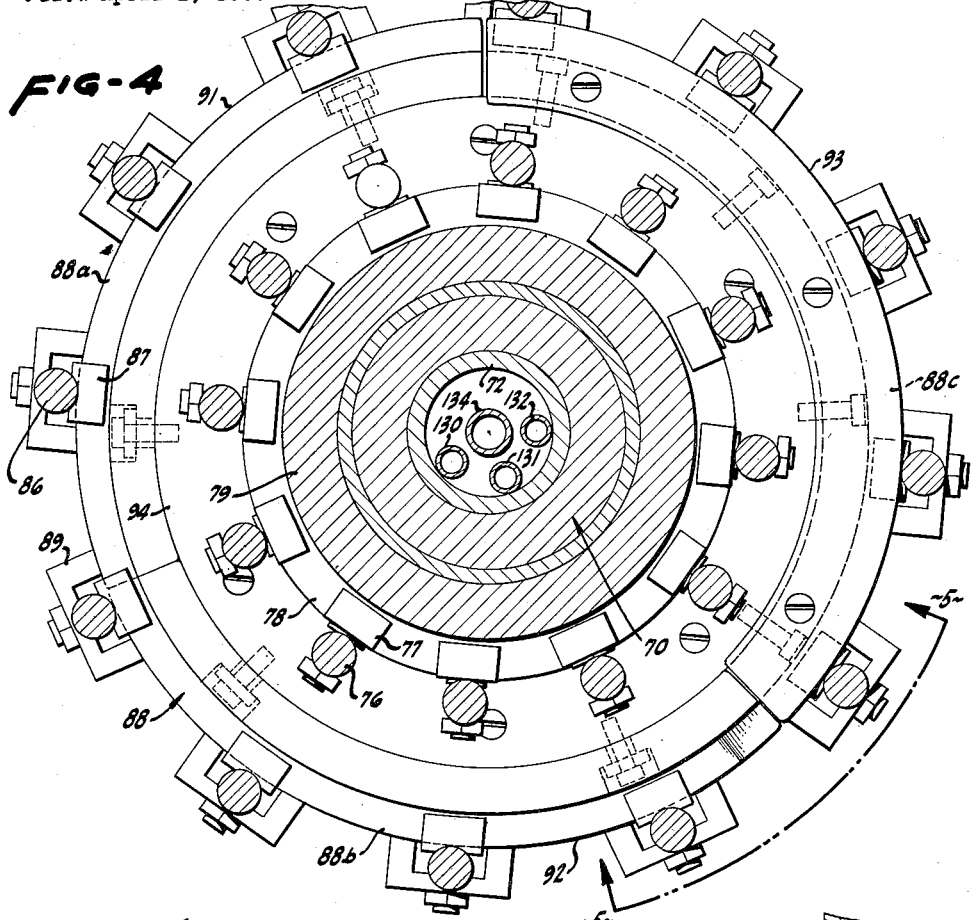
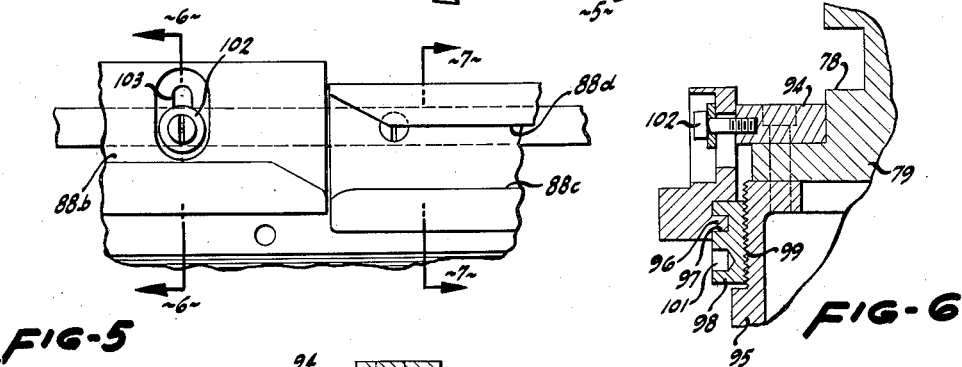
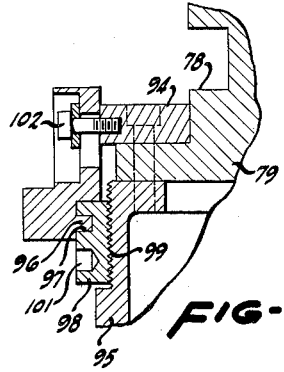
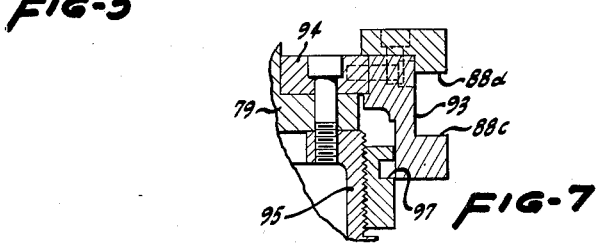

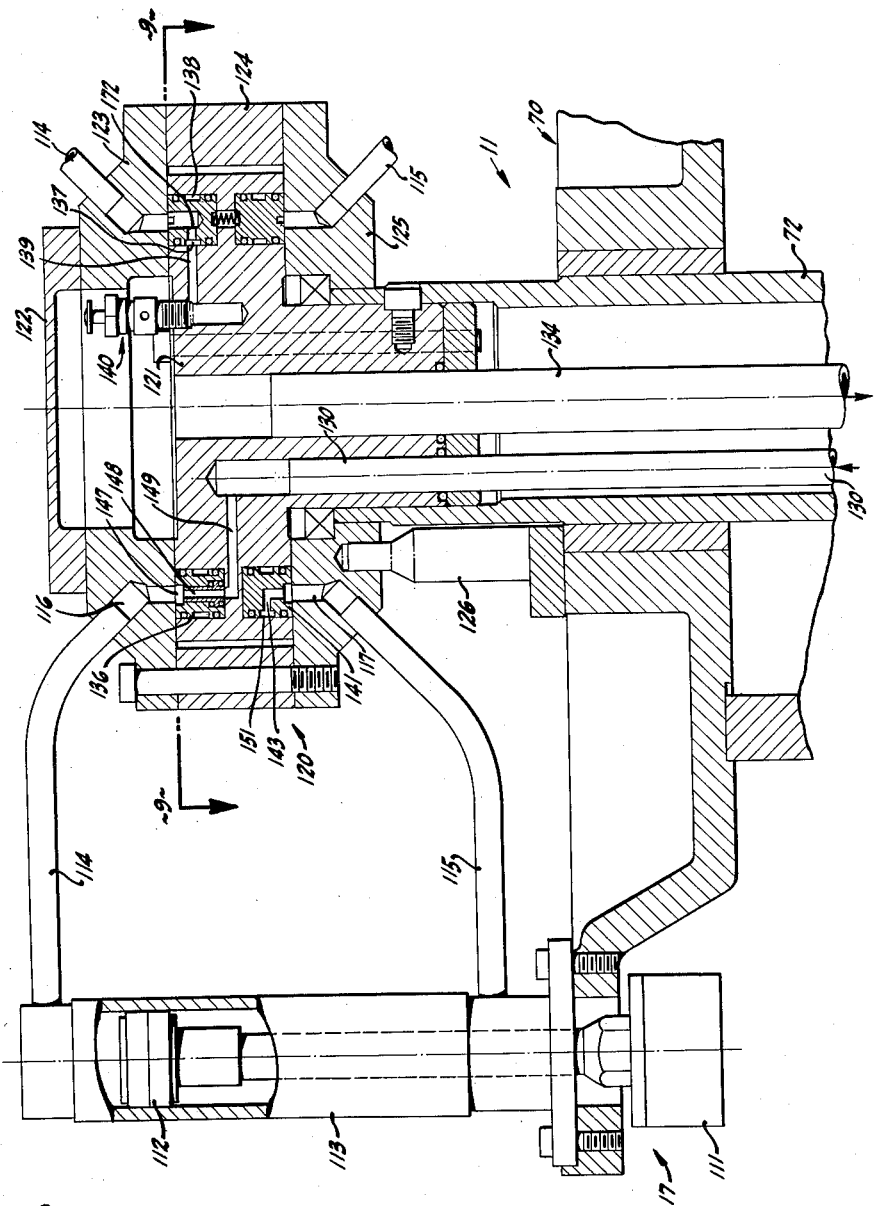

March 27, 1962
A. G. LUTHI ETAL
3,026,660
CAN FILLING MACHINE
Filed April 1, 1960
8 Sheets-Sheet 6
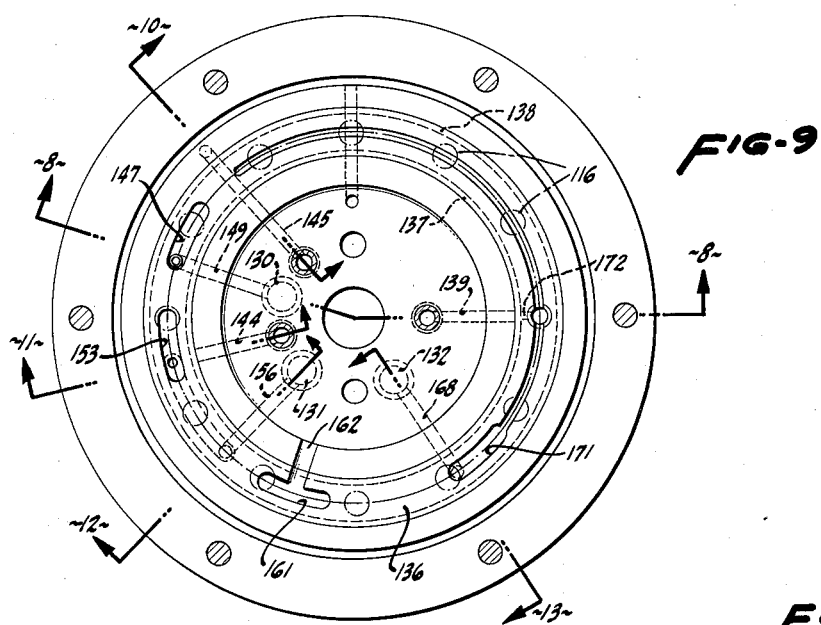
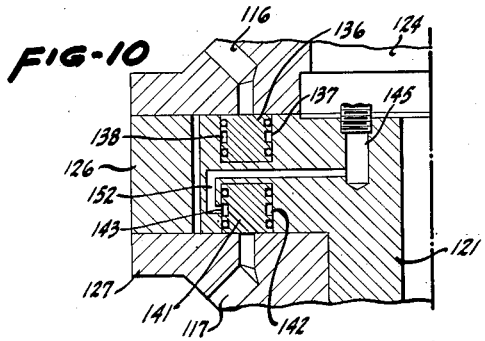
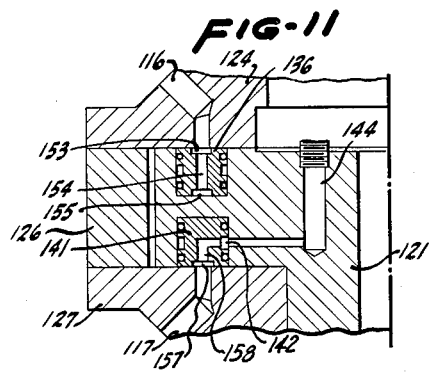
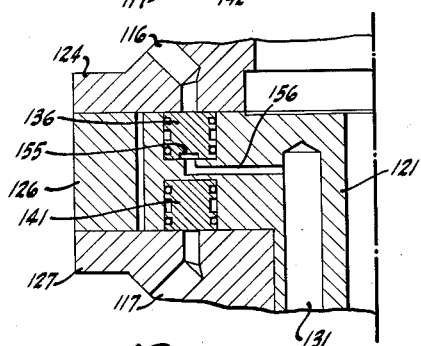
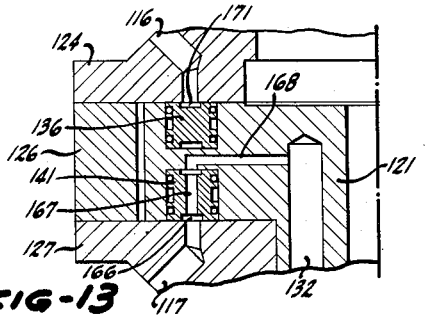
INVENTORS:
ALOIS G. LUTHI
EDWARD E. DUTTON
BY
Mellin and Hanscom
ATTORNEYS

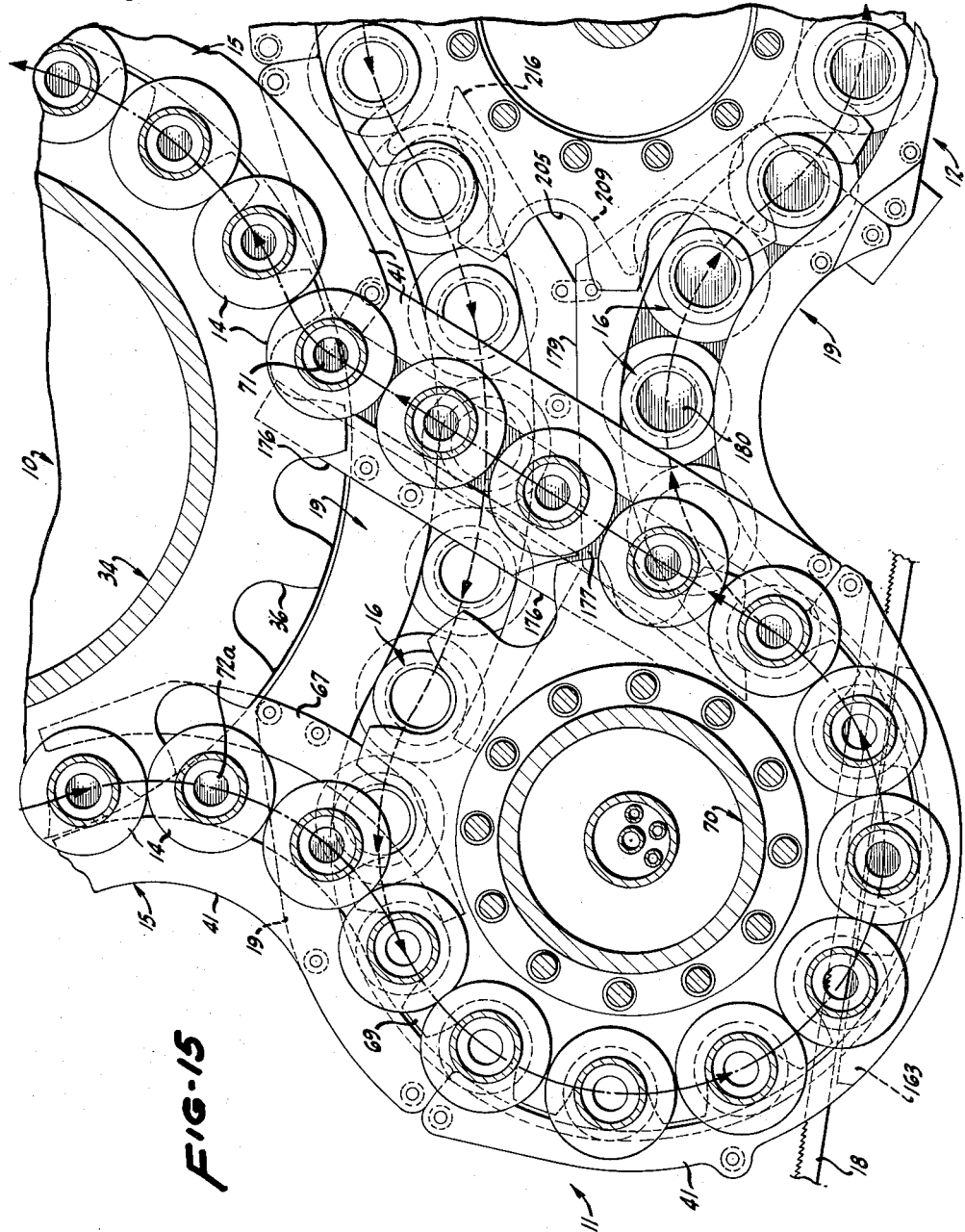

United States Patent Office 3,026,660
Patented Mar. 27, 1962

3,026,660
CAN FILLING MACHINE
Alois G. Luthi, Gardena, and Edward E. Dutton, Whittier, Calif., assignors to Luthi Machinery & Engineering Co., Inc., Gardena, Calif., a corporation of California
Filed Apr. 1, 1960, Ser. No. 19,257
18 Claims. (Cl. 53—124)

This invention relates to can filling machines, and more particularly to such machines as are used in filling cans with meat or other similar substantially homogeneous and compressible solid products, as well as to a method for canning such products.

The filling of cans with a desired weight or amount of a liquid or semi-liquid material does not present too much of a problem in so far as the measurement of such material is concerned, since such materials are substantially incompressible. Thus, if a can is filled to a given point, as by filling the can with a given volume of material, then the weight of the contents will be a fixed amount. If a plurality of equal size cans are filled with equal volumes of material, then the weight of the contents in each can will be equal.

Different problems arise, however, if the material to be handled is of a compressible solid material, as, for example, meat products. Frequently such products are in ground or chunk form when delivered to the canning machine, and the weight of the product per unit volume, or the density of the product, will depend on the degree of compaction of the product. Thus, a number of equal volume containers could be filled completely to the top of the cans, and yet, each container might contain a different weight of meat, if the meat product is not compacted equally within each container. The product could be weighed before it is put into each container so that the containers would be equally filled, but such a method is difficult in practice because of the necessity for high speed can filling and the attendant problem of high speed weighing. To solve this problem, applicants have devised a method of filling containers with equal amounts of such products by forcing the product into the containers under a constant pressure so that the degree of compaction, or the density, of the product in each container is equal. With an equal density of meat in each container, the weight of the product in each container is thus equal. The particular machine disclosed in this application has been devised to perform this operation in a fully automatic manner.

It is a primary object of this invention to provide a method and apparatus for the automatic filling of cans with equal weights of a compressible solid material.

Another object of the invention is to provide apparatus for placing equal weights of a compressible solid food product into cans and in which the food product fills only a portion of the volume of the cans.

Another object of the invention is to provide a can filling machine for filling cans with equal weights of a compressible food product and in which the amount of product can be easily varied.

A further object of the invention is to provide a can filling machine in which the elements that come into contact with the product handled by the machine can be easily cleaned.

A still further object of the invention is to provide a method and apparatus for measuring equal weights of a compressible product wherein the product is subjected to compression by a predetermined force, and a predetermined volume of the compressed product is separated from a larger volume of the product.

Another object of the invention is to provide apparatus wherein a plurality of equal volume metering containers are used and in which a compressible and homogeneous solid product is forced into each metering container with an equal pressure so that each container will have an equal weight of the product therein.

Other objects and advantages will become apparent in the course of the following detailed description.

In the drawings, forming a part of this application, and in which like parts are designated by like reference numerals throughout the same, FIG. 1 is a plan view of a can filling machine constructed in accordance with the present invention.

FIG. 2 is an elevational sectional view of the filling turret unit of the machine, taken on line 2—2 of FIG. 1.

FIG. 3 is an elevational sectional view of the metering turret unit of the machine, taken on the line 3—3 of FIG. 1.

FIG. 4 is a sectional view through the metering turret, taken on line 4—4 of FIG. 3.

FIG. 5 is an elevational detail of the metering turret illustrating the cam track for the bottom closure plungers, as seen from the line 5—5 of FIG. 4.

FIGS. 6 and 7 are sectional views, with parts shown in elevation, of the cam track of FIG. 5 and taken on lines 6—6 and 7—7, respectively, of FIG. 5.

FIG. 8 is a sectional view of a portion of the metering turret, with parts shown in elevation and illustrating the rotary slide valve mechanism for supplying fluid under pressure to the fluid pressure operated metering plungers, with the valve parts as seen from line 8—8 of FIG. 9.

FIG. 9 is a view of the slide valve of FIG. 8, as seen from the line 9—9 thereof.

FIGS. 10, 11, 12 and 13 are sectional views of the construction of the slide valve of FIGS. 8 and 9, as taken on lines 10—10, 11—11, 12—12 and 13—13 of FIG. 9.

Figure 1:
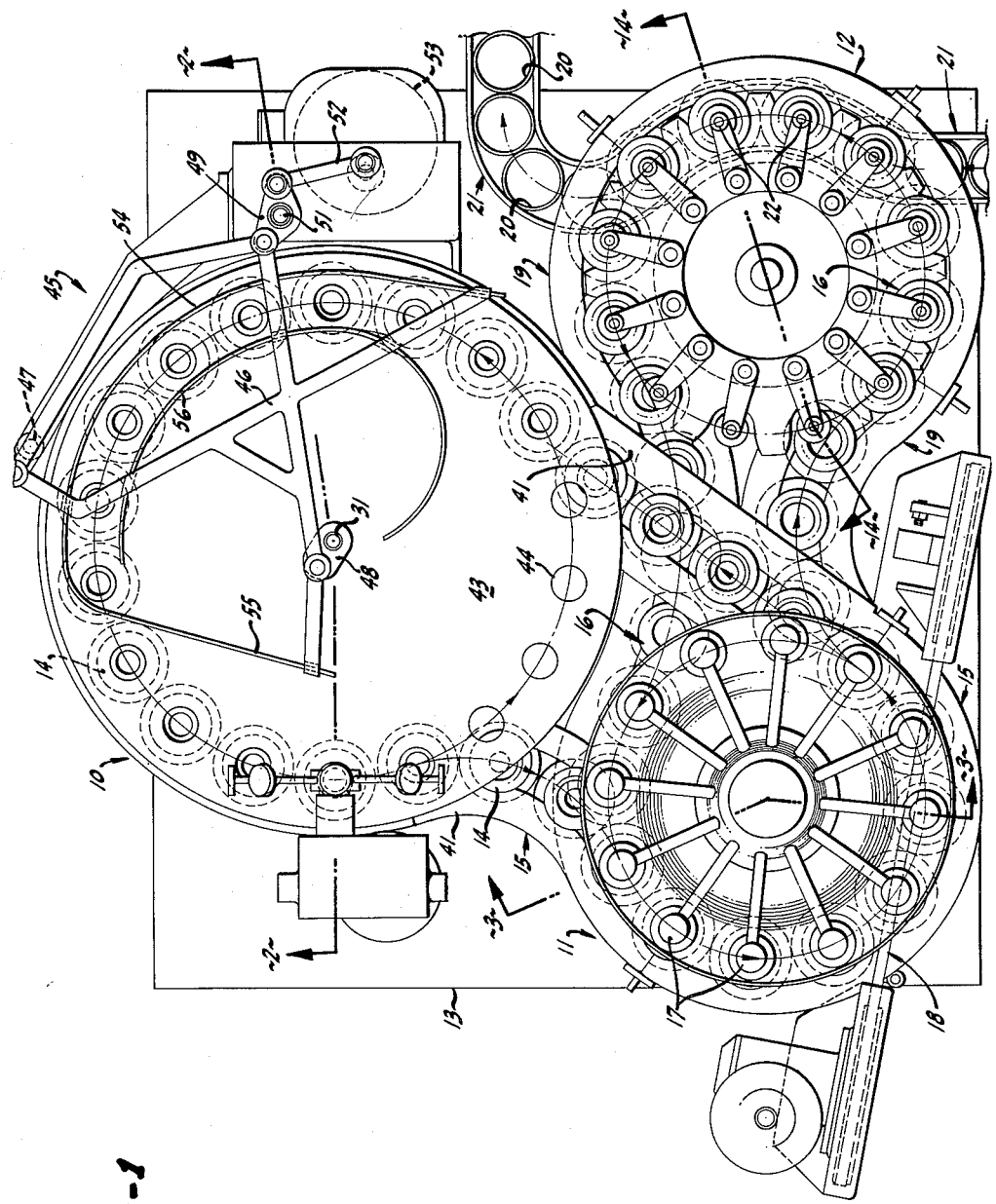
Figure 14:
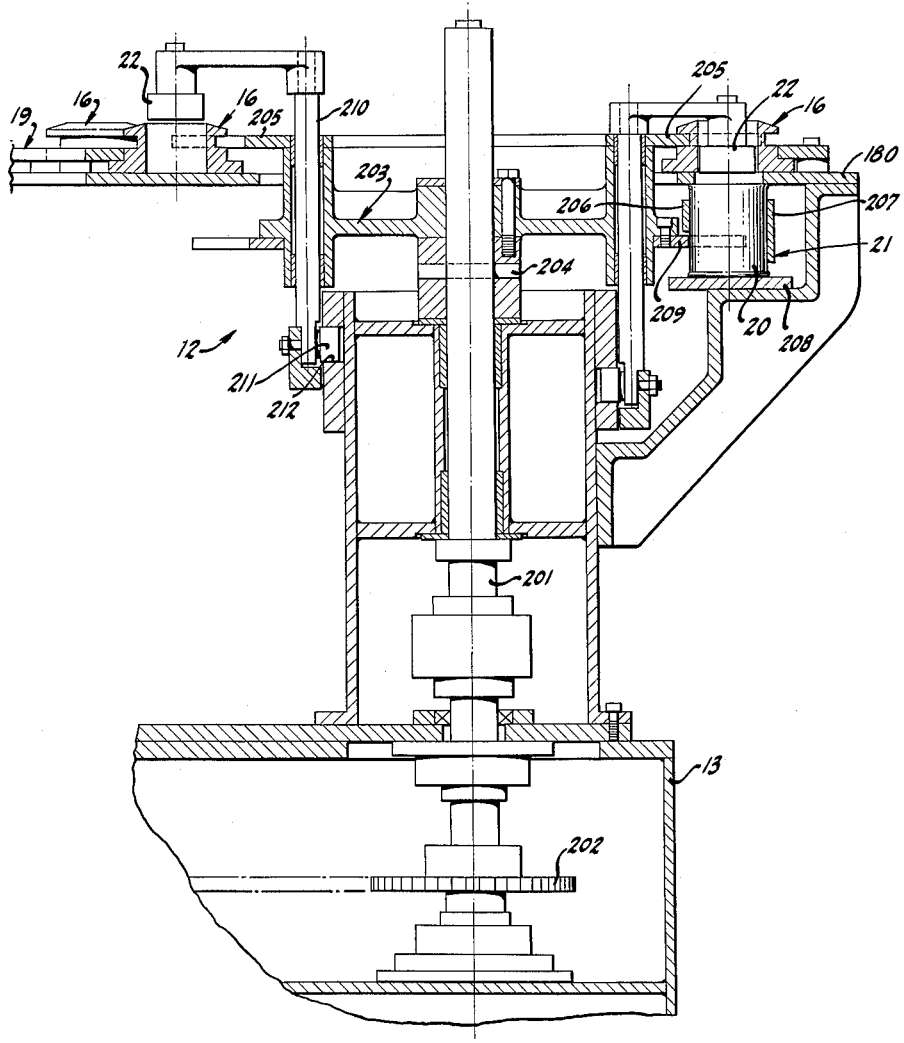

FIG. 14 is a sectional view of the packing turret, with parts shown in elevation, and taken on line 14—14 of FIG. 1.

FIG. 15 is an enlarged plan section illustrating the arrangement and operation of the article conveyors of the machine.

In terms of general inclusion, and referring to FIG. 1, the can filling machine constructed in accordance with the invention comprises three main units: an initial filling unit 10, a metering unit 11 and a packing unit 12, all mounted on a common frame 13. A plurality of filling containers 14, hereinafter referred to as primary pockets, travel in an article conveying line 15 around and between the filling and metering units 10 and 11. As the primary pockets 14 pass around the filling unit, they are each filled loosely with a compressible and substantially homogeneous food product.

The filled primary pockets 14 then move along the article conveying line 15 to the metering unit wherein they come into vertical alignment with metering containers, or pockets, 16. Fluid pressure operated plungers 17 are pushed down into the primary pockets, forcing a portion of the food product therein down into the metering pockets. The pressure is brought to a final predetermined amount, subjecting the product to a predetermined degree of compaction. The pressure is then relieved, and a saw blade 18 operates between the primary and metering pockets to sever the column of food product partially contained in each.

The now filled metering pockets move along article conveying line 19 to the packing unit 12. At this unit, the metering pockets come into vertical alignment with cans 20 moving along another article conveying line 21. Cam-operated ejecting plungers 22 mounted on the packing unit force the contents of the metering pockets into the cans. The emptied metering pockets are returned to the metering unit 11, and the filled cans 20 move along line 21 to subsequent operating stations.

Referring now to the specific details of the can filling machine, the filling unit 10, illustrated in FIGS. 1 and 2, comprises a vertical shaft 31 journaled for rotation in frame 13 and having gear 32 on the lower end thereof driven by chain 33 from a suitable power drive unit (not shown). Shaft 31 has the filling turret 34 supported thereon and fixed against rotation relative thereto by key 35. Two sets of sprocket teeth 36 and 37 are fixed to the outer periphery of turret 34 for engagement with the primary pockets 14.

The primary pockets 14, best seen in FIG. 2, are generally cylindrical in shape, with the lower end thereof tapering downwardly to a bottom opening 38. Each primary pocket has peripheral grooves 39 and 40 engageable by sprockets 36 and 37 so that the primary pockets can be moved by the turret 34. The engagement of the sprockets with the grooves 39 and 40 also prevents vertical movement of the primary pockets relative to the turret, since the sprocket 37 has a thickness substantially the same as the width of pocket groove 40. Groove 40 also receives the lowermost of the outer rails 41 of conveying line 15 therein, which rail also prevents vertical movement of the primary pockets relative to the machine as they travel around conveying line 15.

The bottoms of the lower flange of the primary pockets are sloped upwardly at 42 so that they will slide more easily into the top of the metering pockets 16 when brought into vertical registration therewith.

A feed plate 43, fixed to the upper surface of turret 34, is provided with a plurality of feed holes 44 therethrough, one of each such holes being in registration with the upper open end of one of the primary pockets 14.

The feed hopper 45, disposed above the top of the feed plate 43, comprises a frame 46 pivotally mounted at 47 in fixed relation to frame 13. The frame 46 is also pivotally connected to link 49 which, in turn, is pivotally mounted at 51 in fixed relation to frame 13. The other end of link 49 is connected to link 52 eccentrically driven by motor 53. As motor 53 operates, the frame 46 will be vibrated around the fixed pivot point 47. A vertical apron 54 mounted on feed hopper frame 46 extends downwardly to adjacent the outer periphery of the feed holes 44 of the feed plate 43. An extension 55 of the apron extends along this outer periphery for a ways and then curves back towards the center of the feed plate 43. A second apron 56, also carried by feed hopper frame 46, extends from generally near the center of feed plate 43 to around the inner periphery of the feed holes 44 in generally parallel relation to apron 54.

The hopper 45 is kept filled with meat products, either by hand or automatically, and the vibration of the hopper causes the meat to fall loosely through the feed plate openings into the primary pockets as they pass underneath the hopper. As the primary pockets pass beyond the hopper, the apron extension 55 scrapes any meat from the top of the feed plate 43, and further rotation of the feed plate forces the scraped meat along the apron 55 to near the center of the feed plate. Continued rotation of the feed plate will then cause the meat to move with the feed plate along apron 56 and back into the discharge end of the hopper, so that no meat is wasted. In addition, this guided movement of the scraped off material prevents this material from falling off the feed plate.

After the primary pockets move beyond the feed hopper apron extension 55, the meat within the pockets is tamped down therewithin by the tamping unit 60 so that no meat will be wasted as the primary pockets are stripped from the filling unit.

The tamping unit 60, best seen in FIG. 2, comprises a column 61 fixed to frame 13 having rotatably journaled therein a shaft 62. Sprocket 63, fixed to the lower end of shaft 62, enables the shaft to be driven by a chain 64 in synchronism with the rotation of shaft 31 and turret 34. The rotation of shaft 62 through the intermeshing of bevel gears (not shown) drives hub 65. The tamping feet 66, mounted on hub 65, move downwardly into the primary pockets 14 to force the level of meat therein below the feed plate 43 as the primary pockets are carried by the turret past the tamping unit.

After the primary pockets have passed by the tamping unit 60, they are stripped from the filling unit 10 and are moved to the packing unit 11.

As may be best seen in FIG. 15, the primary pockets 14 are carried by turret 34 so that the rear surface of the pocket unit comes into engagement with rail 67 of conveying line 15, which cams the pockets out of the sprockets 36 and 37. The pockets are confined between the rails 41 and 67, and are forced by succeeding pocket units along these rails to be engaged by the sprockets 68 and 69 mounted on the rotatable turret 70 of the metering unit 11.

A dead plate 71, secured to the filling turret 34, closes the bottom open ends 38 of the primary pockets when they are in the filling unit 10. A dead plate 72a (FIG. 15), coplanar with dead plate 71, extends between the filling and metering units to provide a bottom support for the contents of the primary pockets as they are transferred from the filling turret to the metering turret.

The metering turret 70, as best shown in FIG. 3, is journaled for axial rotation concentric to the hollow column 72 fixed to frame 13. Gear 73, fixed to turret 70, meshes with gear 74 on shaft 75 which in turn is rotated by chain drive from the same drive source that drives the filling turret 34.

The upper sprocket 68 on the metering turret 11, which engages the upper primary pocket groove 39, is comprised of a plurality of separate sprocket segments, one segment being provided for each primary pocket. Each sprocket segment is mounted on the upper end of a vertically reciprocal rod 76. A cam roller 77, mounted on the lower end of rod 76, rides in cam track 78 formed in annular frame member 79. As is seen in FIG. 3, there is vertical play between the lower sprocket 69 and the lower primary pocket groove 40, whereas there is practically no vertical play between the upper sprocket segments 68 and the primary pockets. Thus, slight vertical movements of the sprocket segments 68, induced by variations in the vertical height of cam track 78, will cause corresponding vertical movements of the primary pockets associated therewith. The purpose for such movement will be described hereinafter.

The primary pockets 14 are each vertically aligned with one of the metering containers, or pockets, 16. These metering pockets are generally tubular in shape and are open-ended at top and bottom. An annular groove 80 formed around each metering pocket is engaged by outer rail 81 of the article conveying line 19 and by sprocket 82 mounted on turret 70. When the primary and metering pockets 14 and 16 are held in vertical alignment, by sprockets 69 and 82, the lower end 38 of the primary pockets is open to the upper end of the metering pockets.

Each metering pocket 16 has a bottom closing plunger 85 associated therewith, the plunger having a shape complementary to the inside of the metering pockets. The plunger is fixed at the upper end of a rod 86 mounted for vertical reciprocation on turret 70. The lower end of rod 86 has a cam follower roller 87 secured thereto which rolls along the cam track 88. Shoe 89, also secured to the lower end of rod 86, prevents rotation of the rod 86 and maintains the cam follower roller in contact with the cam track 88.

The cam track 88 is formed from three arcuate cam members 91, 92 and 93, best seen in FIGS. 4–7, all secured to annular ring 94 bolted to frame members 79 and 95. Cam members 91 and 92 each have portions 96 thereon projecting into external groove 97 formed in adjustment ring 98. This ring is theaded at 99 onto frame member 95, and has suitable spanner wrench recesses 101 thereinto.

The cam members 91 and 92 can be vertically adjusted by loosening the screws 102 securing the members to ring 94, and by then rotating the adjustment ring 98 on frame member 95. Cam members 91 and 92 will be prevented from rotating with adjustment ring 98 because of screws 102, but will move upwardly or downwardly with the adjustment ring 98, such movement being permitted by screw slots 103. After the desired height is obtained, screws 102 are retightened to secure the cam members 91 and 92 rigidly to the frame.

Rotation of adjustment ring 98 does not affect the position of cam member 93, since there is no interconnection therebetween. Cam member 93 has an upper cam track surface 88d engagable by cam follower roller 87.

As turret 70 rotates, the cam rollers 87 will move upwardly as they engage the vertically adjustable cam tracks 88a and 88b and will move the plungers 85 up through the guide plate 104 into the lower open end of the metering pockets 16. Since each rod 86 is the same length, the unoccupied volume of each metering pocket will be the same. As is apparent from the foregoing, the unfilled volume of the metering pockets can be varied by a vertical adjustment of the adjustment ring 98.

As the turret 70 continues to rotate, the cam followers will engage cam track 88d on the stationary cam member 93 and will be cammed downwardly sufficiently to remove the plungers from the metering pockets, freeing the metering pockets for removal from the metering turret 70. Cam surface 88d will hold the plungers downwardly until the cam rollers again engage cam surface 88a.

Associated with each primary pocket and metering pocket is a fluid pressure operated, vertically-reciprocatory metering plunger 17 having a plunger head 111 thereon complementary to and adapted to fit into the open upper end of the primary pockets 14. The upper end of plunger 17 is provided with an enlarged piston head 112 slidably received within cylinder 113 fixed to turret 70 for rotation therewith. Conduits 114 and 115 connect the upper and lower ends of the piston chamber inside cylinder 113 to ports 116 and 117 of the rotary slide valve 120.

The slide valve 120 comprises a stationary cylindrical core piece 121 mouned in fixed relation to the hollow column 72, and a rotary slide housing encompassing the core piece and comprised of the interconnected cover 122, top plate 123, spacer ring 124 and bottom plate 125. Pin 126, fixed at its lower end to turret 70, projects upwardly into the bottom plate 125 so that the slide housing rotates integrally with the turret.

The core piece 121 has three inlet passages formed therethrough to which are connected fluid inlet pipes 130, 131 and 132 extending downwardly through column 72. These inlet pipes are then connected to a conventional source of fluid under pressure 133 in such manner that the fluid pressure inlet pipe 131 is connected to a higher pressure than inlet pipe 130. The fluid pressure source 133 may be either a conventional air compressor or hydraulic pump, depending upon whether it is desired to use air or liquid (such as oil) for the pressure fluid. In addition, the core piece 121 has an exhaust pipe 134 connected thereto for exhausting the area of the slide housing under top plate 123. The exhaust pipe may simply be open to atmosphere if air is being used as a pressure fluid. If a hydraulic fluid is being used, the exhaust pipe 134 will be connected to a suitable hydraulic reservoir (not shown) from which the intake of fluid compresser will also be connected in a conventional manner.

The core piece 121 has an annular groove formed in the upper surface thereof into which is fitted an annular valve insert 136. The valve insert has inner and outer annular grooves 137 and 138 extending completely there around. As seen in FIG. 8, core piece 121 has a passage 139 communicating groove 137 to the exhaust pipe 134 through a conventional needle valve 140. Thus, whenever groove 137 becomes connected to a source of pressure, the pressure will bleed out through needle valve 140 and exhaust through the exhaust pipe 134, with the rate of bleeding of the exhaust being determined by the setting of the needle valve.

Similarly, an annular valve insert 141 is fitted into the lower surface of core piece 121. The inner and outer annular grooves 142 and 143 connect by passages 144 and 145, respectively, to conventional needle valves 140 so that grooves 142 and 143 may be exhausted at a controlled rate.

In the operation of the metering unit, the primary pockets and metering pockets come together at the metering turret 70 and are held in vertical alignment by the sprockets 68, 69 and 82. When the metering pockets are initially delivered to the metering turret, the bottom closing plungers 85 associated therewith are in their lowermost position, retracted by cam surface 88d. Similarly, the metering plungers 17 associated with the primary pockets are in their uppermost positions when the primary pockets are first delivered to the metering turret.

After the metering pockets are engaged by the sprocket 82, the bottom closing plunger 85 is moved up into the pocket by cam surface 88a. As previously described, each plunger 85 will be moved up into the metering pocket associated therewith to the same height so that all of the metering pockets will have the same unfilled volume.

After a primary pocket comes into vertical alignment with a metering pocket, the slide valve port 116 associated therewith comes into registration with the arcuate groove 147 formed in the top of valve insert 136 which is connected to the pressure fluid source 133 by passages 148 and 149 and inlet pipe 130 (FIG. 8). This initial pressure is applied to the upper side of piston 112, forcing it downwardly into the primary pocket 14. At the same time, the lower side of piston 112 is exhausted through valve port 117, valve insert passage 151, annular valve groove 143 (FIG. 8), passages 152 and 145 (FIG. 10), needle valve 140 to exhaust pipe 134. The needle valve 140 regulates the exhausting of the piston chamber below piston 112 so that the piston is not driven downwardly abruptly as soon as fluid pressure is applied thereon. Instead, the relatively slowly exhausting fluid below the piston provides a cushioning effect.

The force exerted by the piston and plunger pushes the contents of a primary pocket down into the metering pocket, causing the metering pocket to fill. There is a sufficiently loose fit between the primary and metering pockets and the plungers 17 and 85 therein to allow air to escape freely from the metering pocket, while yet being sufficiently tight fitting to prevent extrusion of the meat product from the pockets.

This initial pressure will be maintained on the piston and plunger for approximately 35° of travel around the metering turret. As shown in FIG. 9, each upper slide valve port 116 will register with arcuate groove 147 for approximately 25° of rotation of turret 70. After the ports 116 move out of registration with groove 147, the pressure remains above the piston 112 because there is no way for this pressure to exhaust.

After about 10° more of rotation, the valve port 116 moves into registration with arcutate groove 153 to apply the final pressure to the plunger 17. The upper piston chamber in cylinder 113 connects to the final pressure through conduit 114, valve port 116, arcuate groove 153 in the top surface of valve insert 136 (FIG. 11), vertical passage 154, lower arcuate groove 155 in valve insert 136, core piece passage 156 (FIG. 12) and inlet pipe 131 which connects to the pressure fluid source 133. The lower piston chamber in cylinder 113 again is exhausted through the following route: conduit 115, valve port 117, lower arcuate groove 157 in lower valve insert 141 (FIG. 11), passage 158, inner annular groove 142, passage 144, needle valve 140, and exhaust pipe 134.

This final pressure will be exerted and maintained on plunger 17 for approximately 60° of rotation of the metering turret. This time is sufficient so that the plunger comes to rest with the downward force thereon being opposed by the resistance of the meat product to further compaction. The final pressure also insures that there are no unfilled air spaces within the metering pocket.

After the 60° of final pressure, the slide valve ports 116 come into registration with arcuate groove 161 which connects by radial passage 162 to the exhaust pipe 134. At this time, the upper piston chamber is exhausted, relieving the pressure on the meat products in the primary and metering pockets. There will be a tendency for the product to expand from its compressed state, but the amount of expansion in each set of pockets will be the same since the force of compression was the same.

With the pressure on both sides of piston 112 relieved, the turret rotates the primary and metering pockets against the band saw blade (FIGS. 1 and 15) to sever the column of meat product partially contained in each pocket. As the column is severed by the continual rotation of turret 70 past the motor driven saw blade 18, the dead plate 163 secured in fixed relation to frame 13 enters the cut between the primary and metering pockets to prevent the meat product from recombining.

During the sawing operation, the primary pockets 14 are moved upwardly by shafts 76 and cam track 78 to allow the saw blade to be inserted between the pockets.

An important aspect of this invention is the manner in which the pneumatically operated plungers insure that the metering pockets 16 will be uniformly filled, with the same weight of material being in each pocket. The meat product, for which this embodiment of the invention has been designed, is delivered to the filling unit 10 in the form of small, inherently resilient chunks of varying size. Due to the nature of the product and the gravity filling, the weight of meat product which fills each primary pocket, as it passes under the feed hopper, will vary, even though each pocket may be filled up to its top. That is, each primary pocket will have an equal volume of air and meat therein, but the ratio of air to meat may vary over wide ranges. If a constant volume of meat in the primary pockets were to be pushed into the metering pockets, as by a constant distance stroke of the metering plunger 17, the density of the meat in each metering pocket could still vary widely, with a result that the amount of meat within each pocket could also vary widely instead of being uniform, as desired.

This problem is solved by using a movable plunger which can vary in the length of its stroke, and which is operated under a constant pressure. Thus, as the plunger is forced downwardly into the pockets, it will force the meat product down to fill the metering pockets and will then compact the product within the pockets until the density of the product is sufficient to resist further compacting movement created by the constant force exerted by the constant fluid pressure operated plunger. If the meat product is very loosely filling the primary pocket, the plunger 17 must travel a substantial distance downwardly into the primary pocket before the meat is compacted to a density sufficient to withstand further plunger travel, whereas if the meat product is originally fairly compact, the plunger need move through only a relatively short distance before the density of the meat product is sufficient to withstand further plunger travel. In either case, however, the meat product will be compacted to the same density, since the force acting upon the plunger is constant. Because the degree of compaction is uniform, the density and therefore weight or amount of meat within each metering pocket will be uniform, although the amount of meat remaining in the primary pocket may vary from pocket to pocket.

The weight of the material metered into each metering pocket, as described above, is thus a function of the amount of pressure exerted on the plunger 17 and of the volume of the metering pocket. It is obvious then, that the desired weight of meat to be packed into each can may be varied within a limited range by adjusting the pressure of the pressure fluid source 133. If a higher pressure is used, the density of material within each metering pocket will be greater, and consequently, the weight of the material within the metering pocket will be greater. Correspondingly, if a lower pressure is used, the weight of the meat within the metering pocket will be decreased. Similarly, the weight in each metering pocket can be varied by adjusting the stroke of the bottom closing plungers 85 so that the volume of the metering pockets is varied.

The term "substantially homogeneous," used in this application, is intended to encompass not only a single material, as, for example, a specific meat product, but also includes mixtures, as, for example, hash products, so long as the material is sufficiently well mixed such that the composition of the mixture does not vary appreciably throughout the batch delivered to the filling unit.

A continual rotation of turret 70 (approximately 65° from the initial registration of a port 116 with groove 161) brings the lower slide valve port 117 into registration with the arcuate groove 166 formed in the lower surface of valve insert 141. This causes a retract pressure to be applied to the lower piston chamber through conduit 115, valve port 117, arcuate groove 166 (FIG. 13), vertical passage 167, core piece passage 168 and the inlet pipes 132 to the fluid pressure source 133. At the same time, the upper piston chamber is exhausted through conduit 114, valve port 116, arcuate groove 171 in the upper surface of the upper valve insert 136 (FIG. 13), insert passage 172 (FIG. 9), core piece passage 139, needle valve 140 and the exhaust pipe 134.

The retract pressure in the lower piston chamber forces the plunger 17 up out of the primary pocket, with the rate of rise being controlled by the adjustment of the needle valve to regulate the rate of exhaust of the upper piston chamber. The plunger will remain in its upper retracted position for approximately 200° of rotation of the metering turret until it is again time for the above cycle of operation to begin again.

After the metering plunger 17 has been retracted, the primary pockets 14 are stripped from sprockets 68 and 69 by rail 176 (FIG. 15) of conveying line 15, and are forced along this conveying line by succeeding pockets 14 until they are reengaged by sprockets 36 and 37 of the filling turret. Since the primary pockets still have some of the meat product therein, a dead plate 177, fixed to frame 13, is provided to close the bottom of the primary pockets as they are transferred back to the filling turret. The dead plate 177 is coplanar with the filling turret dead plate 71.

After the metering pockets 16 have been moved past the saw blade 18, the bottom closing plungers 85 are retracted therefrom by the engagement of the cam follower roller 77 with the cam track surface 88d. Regardless of the vertical adjustment of the cam track surfaces 88a and 88b, surface 88d remains fixed so that the bottom closing plungers 85 will always be completely retracted from the bottom of the metering pockets.

After retraction of the bottom closing plungers, the metering pockets are carried by metering turret 70 into engagement with rail 179 of conveying line 19 which strips the metering pockets from metering turret sprockets 82. Succeeding metering pockets then push the stripped off pockets along conveying line 19 to the packing unit 12. A dead plate 180 extends between the metering and packing units to close the bottoms of the metering pockets until the contents therein are expelled into the cans 20.

The packing unit 12 comprises a shaft 201 journaled for rotation in frame 13 and having sprocket 202 thereon chain-driven in synchronism with the operation of the filling and metering units previously described. Packing turret 203 is mounted on the upper end of shaft 201 and is secured for rotation therewith by pin 204.

As the metering pockets come to the packing turret 203 they are engaged by sprocket 205 fixed to the turret to hold the metering pockets in fixed relation to the turret as it rotates.

As best seen in FIGS. 1 and 14, the open-topped cans 20 are confined between rails 206 and 207 of the can conveying line 21 and slide on plate 208 forming the bottom of the conveying line. The packing turret sprocket 209 which engages the cans and moves them along the conveying line 21 also holds the cans in fixed vertical alignment with the metering pockets 16 until the cans are stripped from sprocket 209 by rail 206.

Associated with each metering pocket 16 is an ejecting plunger 22 secured to the upper end of a rod 210 mounted for vertical reciprocation in turret 203. A cam roller 211, mounted on the lower end of rod 210, rides in cam track 212 secured in fixed relation to frame 13. During most of the rotation of turret 203, cam track 212 and cam roller 211 maintain the ejecting plunger 22 in its uppermost position illustrated in the left-hand side of FIG. 14. During the time that conveying lines 19 and 21 are superposed, that is, during the time that the metering pockets and cans are vertically aligned, cam track 212 dips downwardly causing the ejecting plunger 22 to force downwardly through metering pockets to empty the food product into the cans 20.

After ejectment, the plunger 22 moves upwardly, and the turret 203 moves the metering pockets against rail 216, causing the metering pockets to be stripped from sprocket 205. Succeeding metering pockets push previously stripped pockets along conveying line 19 until they reengage the metering turret.

Another important aspect of the invention is that each metering pocket 16 is completely separate and independent from any other metering pocket, rather than being each connected to a common endless chain, as has been the practice heretofore. This enables any desired metering pocket to be easily removed from the machine, for inspection, cleaning, repair, or the like, without the necessity of detaching the pocket from a chain, and without affecting any other pockets. Furthermore, much difficulty has been experienced in the past in cleaning such endless chains to standards required by various health ordinances. This later difficulty is overcome by eliminating the chain entirely. In the same manner, the primary pockets 14 are entirely separate and independent from each other, so that any desired pocket may be removed from the machine without affecting any of the other pockets. The metering pockets conveying line 19 and the primary pocket conveying line 15 are each made in sectional form, so that any section of these lines may be removed to allow removal of the desired metering pocket or primary pocket from any desired position thereof.

From the foregoing, it may be seen that a can filling machine has been devised which is easy to clean, and which ensures uniformity in the packing of the food product into the cans. Although the machine has been specifically described in connection with the packing of meat products, it is to be realized that any other non-liquid foodstuff or material, having the same general characteristics as set forth above, may be canned by this invention.

In the preceding description, the embodiment of the invention has been used in the canning of a stew wherein only a portion of the can is to be filled with meat. As a consequence, the cans 20 have larger volumes than the metering pockets. However, the described method could be used to fill cans directly without the use of the metering pockets 16, if the cans are to be filled completely with a desired weight of meat. In such event, the cans themselves would become the metering pockets and would each receive an equal weight of the substantially homogeneous food product when forced thereinto under pressure.

It is, of course, to be realized that the form of the invention herein shown and described is to be taken as a preferred embodiment of the same and that various changes may be made in the shape, size and arrangement of parts without departing from the spirit of the invention or the scope of the following claims.

Having thus described our invention, what we claim and desire to secure by Letters Patent is:

1. In a can filling machine, a tubular filling container open at both ends and adapted to be filled with a compressible, generally homogeneous food product, a tubular metering container closed at one end and having an open end adjacent one open end of said filling container, a plunger reciprocally movable into and out of the other open end of said filling container and having a shape complementary to the interior of said filling container, a piston chamber closed at both ends, a piston member slidably movable in said piston chamber, a rod connecting said piston and plunger for unitary movement, a first conduit into one end of said piston chamber, a second conduit into the other end of said piston chamber, and valve means to connect one of said conduits to a source of fluid under pressure while exhausting the other of said conduits to lower pressure.

2. In a can filling machine, a tubular filling container open at both ends and adapted to be filled with a compressible, generally homogeneous food product, a tubular metering container closed at one and having an open end adjacent one open end of said filling container, a plunger reciprocally movable into and out of the other open end of said filling container and having a shape complementary to the interior of said filling container, a piston chamber closed at both ends, a piston member slidably movable in said piston chamber, a rod connecting said piston and plunger for unitary movement, and means to alternately connect one end of said chamber to a source of fluid under pressure while exhausting the other end of said chamber.

3. In a can filling machine, a tubular filling container open at both ends and adapted to be filled with a compressible, generally homogeneous food product, a tubular metering container closed at one end and having an open end adjacent one open end of said filling container, a plunger reciprocally movable into and out of the other open end of said filling container and having a shape complementary to the interior of said filling container, a piston chamber closed at both ends, a piston member slidably movable in said piston chamber, a rod connecting said piston and plunger for unitary movement, a first conduit into one end of said piston chamber, a second conduit into the other end of said piston chamber, a third conduit adapted to be connected to a source of fluid under pressure, a fourth conduit adapted to be connected to a source of fluid under a greater pressure than that to which said third conduit is to be connected, valve means connected to said conduits and having three positions in which the first valve position simultaneously connects said first and third conduits together and exhausts said second conduit, in which said second valve position simultaneously connects said first and fourth conduits and exhausts said second conduit and in which said third valve position exhausts said first conduit and adapts said second conduit to be connected to a source of fluid under pressure.

4. In a can filling machine as set forth in claim 3 further including needle valves connected through said valve means to said first and second conduits to regulate the rate of exhausting of said conduits.

5. A can filling machine comprising an open-ended, tubular, filling container, an open-ended, tubular, metering container axially aligned with said filling container, said filling container having a volume greater than the volume of said metering container, a plunger reciprocally insertable into the open end of said filling container, fluid pressure operated means for forcing said plunger into said filling container with a constant force, and means insertable between said filling and metering containers to sever a column of said food product contained partially in each container.

6. A can filling machine comprising first and second generally horizontal container conveyor lines, a plurality of open-ended, vertically disposed, tubular, filling containers, means for continuously moving said filling containers around said first conveyor line, a plurality of open-topped, vertically disposed, tubular, metering containers, means for continuously moving said metering containers around said second conveyor line, said conveyor line having one portion thereof underlying a portion of said first conveyor line, means to vertically align said filling and metering containers where said second conveyor line underlies said first conveyor line, said filling containers having a volume greater than the volume of said metering containers, means to fill said filling containers with a compressible food product, a plunger reciprocally insertable into an upper open end of a filling container when said filling container is aligned with a metering container, fluid pressure operated means for forcing said plunger into said filling container with a constant force, means insertable between said filling and metering containers when aligned to sever a column of said food product contained partially in each container, and means to close the open bottom ends of said filling containers during the time from the filling thereof until they come into vertical alignment with said metering containers.

7. A can filling machine as set forth in claim 6 wherein said fluid pressure operated means comprises a piston chamber vertically aligned with and above said vertically aligned filling and metering containers, a piston vertically slidably movable in said chamber, said piston being secured to said plunger, a conduit into said piston chamber above said piston to admit fluid under a predetermined pressure into said chamber, a valve in said conduit, and means to open said valve when said filling and metering containers are vertically aligned.

8. A can filling machanism comprising first and second generally horizontal container conveyor lines, a plurality of open-ended, vertically disposed, tubular, filling containers, means for continuously moving said filling containers around said first conveyor line, a plurality of open-ended, vertically disposed, tubular, metering containers, means for continuously moving said metering containers around said second conveyor line, said second conveyor line having one portion thereof underlying a portion of said first conveyor line, means to vertically align said filling and metering containers where said second conveyor line underlies said first conveyor line, means to fill said filling containers with a compressible food product, a plunger reciprocally insertable into an upper open end of a filling container when said filling container is aligned with a metering container, fluid pressure operated means for forcing said plunger into said filling container with a constant force, means to close the open bottom ends of said filling containers during the time from the filling thereof until they come into vertical alignment with said metering containers, and means to close the open bottom ends of said metering containers when in vertical alignment with said filling containers.

9. A can filling machine as set forth in claim 8 wherein said means to close the bottom ends of said metering containers includes a plunger having a shape complementary to the inside of said metering container, means to hold said plunger at a predetermined height up into the bottom end of a metering container when said metering container is in vertical alignment with a filling container, and means to adjust the predetermined height that said plunger is held up into said metering container.

10. A can filling machine comprising first, second and third generally horizontal container conveyor lines, a plurality of open-ended, vertically disposed, tubular, filling containers, means for continuously moving said filling containers around said first conveyor line, a plurality of open-ended, vertically disposed, tubular, metering containers, means for continuously moving said metering containers around said second conveyor line, means for moving a plurality of open-topped cans along said third conveyor line, said second conveyor line having one portion thereof underlying a portion of said first conveyor line and another portion thereof overlying a portion of said third conveyor line, means to vertically align said filling and metering containers where said second conveyor line underlies said first conveyor line, means to vertically align said metering containers with said cans where said second conveyor line overlies said third conveyor line, said filling containers and cans together having a volume greater than the volume of said metering containers, means to fill said filling containers with a compressible food product, a plurality of plungers reciprocally insertable into the upper open ends of said filling containers when said filling containers are aligned with said metering containers, fluid pressure operated means for forcing said plungers down into said filling containers with a constant force, means insertable between said filling and metering containers when aligned to sever a column of said food product contained partially in each container, means to eject the contents of said metering containers into said cans when vertically aligned therewith, means to close the open bottom ends of said filling containers during the time from the filling thereof until they come into vertical alignment with said metering containers, and means to close the open bottom ends of said metering containers during the time that said metering containers are in vertical alignment with said filling containers and until they come into vertical alignment with said cans.

11. A can filling machine as set forth in claim 10 wherein said fluid pressure operated means comprises a piston chamber vertically alinged with and above said vertically aligned filling and metering containers, a piston vertically slidably movable in said chamber, said piston being secured to said plunger, a conduit into said piston chamber above said piston to admit fluid under a predetermined pressure into said chamber, a valve in said conduit, and means to open said valve when said filling and metering containers are vertically aligned.

12. A can filling machine as set forth in claim 10 wherein said means to close the bottom ends of said metering containers includes a bottom closing plunger having a shape complementary to the inside of said metering container, means to hold said bottom closing plunger at a predetermined height up into the bottom end of a metering container when said metering container is in vertical alignment with a filling container, and means to adjust the predetermined height that said bottom closing plunger is held up into said metering container.

13. A can filling machine comprising a rotatable metering turret means forming first and second article conveying lines around portions of said metering turret, upper and lower sprockets mounted on said metering turret in operative association with said first and second conveying lines respectively, a plurality of open-ended, vertically disposed, tubular, filling containers disposed in said first conveying line for engagement by and movement with said upper sprocket, a plurality of open-topped, vertically disposed, tubular, metering containers disposed in said second conveying line for engagement by and movement with said lower sprocket, said upper and lower sprockets being positioned on said metering turret relative to each other to hold said filling containers in vertical alignment with said metering containers, means to fill said filling containers with a compressible product, means to close the bottoms of said filling containers when out of vertical alignment thereof with said metering containers, a plurality of metering plungers mounted for vertical reciprocation on said metering turret into and out of the upper open ends of said filling containers, and means for forcing said plungers at a predetermined pressure down into said filling containers when said containers are vertically aligned with said metering containers.

14. A can filling machine comprising rotatable filling and metering turrets, means forming a first article conveying line around and between said filling and metering turrets, means forming a second article conveying line around a portion of said metering turret, said first conveying line being above said second conveying line, upper and lower sprockets mounted on said metering turret in operative association with said first and second conveying lines respectively, a plurality of open-ended, vertically disposed, tubular, filling containers disposed in said first conveying line for engagement by and movement with said upper sprocket, a plurality of open-topped, vertically disposed, tubular, metering containers disposed in said second conveying line for engagement by and movement with said lower sprocket, said upper and lower sprockets being positioned on said metering turret relative to each other to hold said filling containers in vertical alignment with said metering containers, means operatively associated with said filling turret to fill said filling containers with a food product as said filling containers travel in said first conveying line around said filling turret, means to close the bottoms of said filling containers during the time between the filling thereof and the vertical alignment thereof with said metering containers, a plurality of metering plungers mounted for vertical reciprocation on said metering turret into and out of the upper open ends of said filling containers, fluid pressure operated means for forcing said plungers at a predetermined pressure into said filling containers when said containers are vertically aligned with said metering containers, and means insertable between said filling and metering containers to sever a food product contained partially in each.

15. A can filling machine as set forth in claim 14 wherein said fluid pressure operated means comprises a plurality of piston chambers vertically alinged with and above said vertically aligned filling and metering containers, a piston vertically slidably movable in each said chamber, said pistons being secured to said metering plungers, conduits into said piston chambers above said pistons to admit fluid under a predetermined pressure into said chambers, a valve in each conduit, and means to open said valves when the filling and metering containers associated therewith are vertically aligned.

16. A can filling machine comprising rotatable filling and metering turrets, means forming a first article conveying line around and between said filling and metering turrets, means forming a second article conveying line around a portion of said metering turret, said first conveying line being above said second conveying line, upper and lower sprockets mounted on said metering turret in operative association with said first and second conveying lines respectively, a plurality of open-ended, vertically disposed, tubular, filling containers disposed in said first conveying line for engagement by and movement with said upper sprocket, a plurality of open-topped, vertically disposed, tubular metering containers disposed in said second conveying line for engagement by and movement with said lower sprocket, said upper and lower sprockets being positioned on said metering turret relative to each other to hold said filling containers in vertical alignment with said metering containers, said filling containers having larger volumes than said metering containers, means operatively associated with said filling turret to fill said filling containers with a food product as said filling containers travel in said first conveying line around said filling turret, means to close the bottoms of said filling containers during the time between the filling thereof and the vertical alignment thereof with said metering containers, a plurality of bottom closing plungers carried by said metering turret, means operatively associated with said metering turret for inserting said plungers a predetermined distance into the bottom of said metering containers as they travel in said second conveying line around said metering turret, a plurality of metering plungers mounted for vertical reciprocation on said metering turret into and out of the upper open ends of said filling containers, fluid pressure operated means for forcing said plungers at a predetermined pressure into said filling containers when said containers are vertically aligned with said metering containers, and means insertable between said filling and metering containers to sever a food product contained partially in each.

17. A can filling machine comprising rotatable filling, metering and packing turrets, means forming a first article conveying line around and between said filling and metering turrets, means forming a second article conveying line around and between said metering and packing turrets, means forming a can conveying line around said packing turret, upper and lower sprockets mounted on said metering turret in operative association with said first and second conveying lines respectively, upper and lower sprockets mounted on said packing turret in operative association with said second article and can conveying lines respectively, a plurality of open-ended, vertically disposed, tubular, filling containers disposed in said first conveying line for engagement by and movement with said metering turret upper sprocket, a plurality of open-ended, vertically disposed, tubular, metering containers disposed in said second conveying line for engagement by and movement with said metering turret lower sprocket and said packing turret upper sprocket, said packing turret lower sprocket being operatively associated with said can conveyor line to engage and move open-topped cans in said line, said upper and lower sprockets of said metering turret being positioned on said metering turret relative to each other to hold said filling containers in vertical alignment with said metering containers, said upper and lower sprockets of said packing turret being positioned on said packing turret relative to each other to hold said metering containers in vertical alignment with said cans, said filling containers having larger volumes than said metering containers, means operatively associated with said filling turret to fill said filling containers with a compressible product as said filling containers travel in said first conveying line around said filling turret, means to close the bottoms of said filling containers during the time between the filling thereof and the vertical alignment thereof with said metering containers, a plurality of metering plungers mounted for vertical reciprocation on said metering turret into and out of the upper open ends of said filling containers, means for forcing said plungers at a predetermined pressure into said filling containers when said containers are vertically aligned with said metering containers, means insertable between said filling and metering containers to sever a food product contained partially in each, means mounted on said packing turrent for ejecting a food product from said metering containers into said cans when said metering containers and cans are vertically aligned, and means for closing the bottom ends of said metering containers during the time that said metering containers are in vertical alignment with said filling containers and until they move into vertical alignment with said cans.

18. A can filling machine comprising rotatable filling, metering and packing turrets, means forming a first article conveying line around and between said filling and metering turrets, means forming a second article conveying line around and between said metering and packing turrets, means forming a can conveying line around said packing turret, said second conveying line being below said first conveying line and above said can conveying line, upper and lower sprockets mounted on said metering turret in operative association with said first and second conveying lines respectively, upper and lower sprockets mounted on said packing turret in operative association with said second article and can conveying lines respectively, a plurality of open-ended, vertically disposed, tubular, filling containers disposed in said first conveying line for engagement by and movement with said metering turret upper sprocket, a plurality of open-ended, vertically disposed, tubular, metering containers disposed in said second conveying line for engagement by and movement with said metering turret lower sprocket and said packing turret upper sprocket, said packing turret lower sprocket being operatively associated with said can conveyor line to engage and move open-topped cans in said line, said upper and lower sprockets of said metering turret being positioned on said metering turret relative to each other to hold said filling containers in vertical alignment with said metering containers, said upper and lower sprockets of said packing turret being positioned on said packing turret relative to each other to hold said metering containers in vertical alignment with said cans, said filling containers and said cans having larger voulmes than said metering containers, means operatively associated with said filling turret to fill said filling containers with a compressible and homogeneous food product as said filling containers travel in said first conveying line around said filling turret, means to close the bottoms of said filling containers during the time between the filling thereof and the vertical alignment thereof with said metering containers, a plurality of bottom closing plungers carried by said metering turret, means operatively associated with said metering turret for inserting said plungers a predetermined distance into the bottoms of said metering containers as they travel in said second conveying line around said metering turret, a plurality of metering plungers mounted for vertical reciprocation on said metering turret into and out of the upper open ends of said filling containers, pneumatic means for forcing said plungers at a predetermined pressure into said filling containers when said containers are vertically aligned with said metering containers, means insertable between said filling and metering containers to sever a food product contained partially in each, means mounted on said packing turret for ejecting a food product from said metering containers into said cans when said metering containers and cans are vertically aligned, and means for bottom-supporting a food product in said metering containers as said metering containers move from said metering turret into vertical alignment with said cans.

References Cited in the file of this patent

UNITED STATES PATENTS

| | | |
|---|---|---|
| 2,044,813 | Rooney | June 23, 1936 |
| 2,037,724 | Jacobs et al. | Apr. 21, 1939 |
| 2,178,884 | Thompson | Nov. 7, 1939 |
| 2,815,621 | Carter | Dec. 10, 1957 |
| 2,911,776 | Sada | Nov. 10, 1959 |
| 2,926,095 | Gorby | Feb. 23, 1960 |
| 2,938,314 | Hopkins | May 31, 1960 |
| 2,957,284 | Harker | Oct. 25, 1960 |